United States Patent [19]

Beeman et al.

[11] 4,041,248
[45] Aug. 9, 1977

[54] TONE DETECTION SYNCHRONIZER

[75] Inventors: Robert Herbert Beeman, Berkeley; Lloyd Arthur Tarr, Elmhurst, both of Ill.

[73] Assignee: GTE Automatic Electric Laboratories Incorporated, Northlake, Ill.

[21] Appl. No.: 734,494

[22] Filed: Oct. 21, 1976

[51] Int. Cl.² .................................. H04M 1/50
[52] U.S. Cl. .................................. 179/84 VF
[58] Field of Search .................. 179/84 VF, 2 A; 340/171 R, 171 A, 171 PF; 328/138, 140

[56] References Cited
U.S. PATENT DOCUMENTS

| | | | |
|---|---|---|---|
| 3,288,940 | 11/1966 | Bennett | 179/84 VF |
| 3,916,115 | 10/1975 | Tarr | 179/84 VF |
| 3,963,878 | 6/1976 | Kessler | 179/84 VF |

Primary Examiner—Kathleen H. Claffy
Assistant Examiner—Joseph A. Popek
Attorney, Agent, or Firm—Robert J. Black

[57] ABSTRACT

A synchronizer circuit for use with tone receivers employed in the reception of asynchronous tones. A plurality of latch stages controlled by an external clock pulse source and internal timing circuitry provides synchronized outputs of a series of signals which represent the input tone on-off sequences.

6 Claims, 1 Drawing Figure

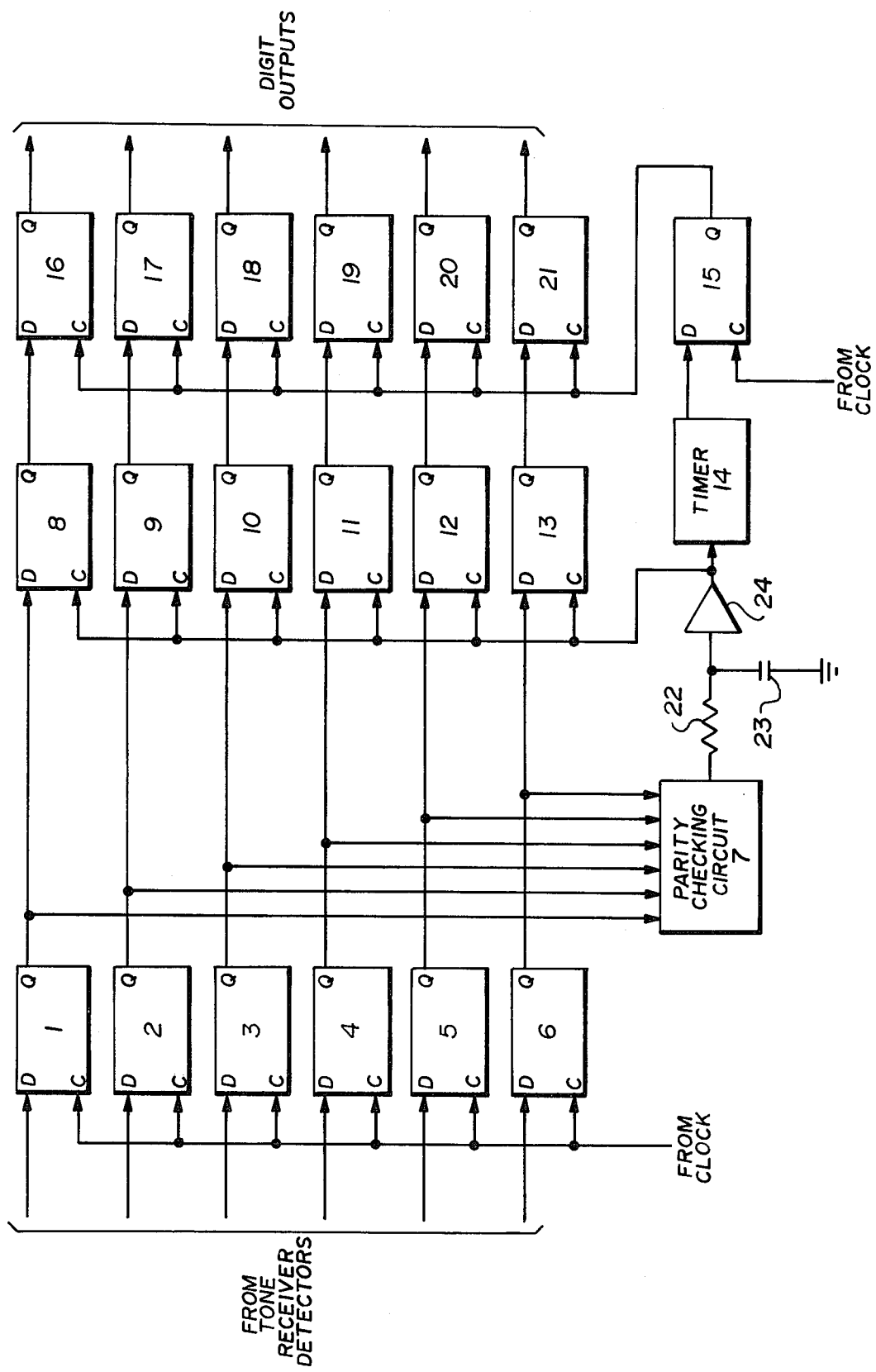

TONE DETECTION SYNCHRONIZER

BACKGROUND OF THE INVENTION

1. Field of the Invention

This invention relates to reception of asynchronous tone signals as used in telecommunication systems and more particularly to a synchronizer circuit for use with tone reception equipment.

2. Description of the Prior Art

Most state of the art tone receivers employ as detectors peak detectors or rectifiers with filters, to drive two separate devices. Usually one of these devices is a parity checking circuit which in turn drives a parity timer, the second being an output circuit driven by both the detector outputs and the output of the parity timer. Such circuitry is taught in U.S. Pat. Nos. 2,719,959, 3,288,940 and U.S. Pat. No. 3,582,565.

In such tone receivers, the intended or usual operation required that when a prescribed number of tone detectors (usually two) are activated, a parity checking circuit activates a parity timer. When the parity timer reaches its true or high state after a predetermined delay, the output circuitry is enabled so that it can latch up those output circuits being fed by detectors which have been turned on. The output circuits are then placed under the control of some other device such as a timer or handshake circuit, so that the output duration and/or identity is no longer controlled by the tone detectors.

The above-outlined arrangements creates problems in that the parity checking circuit and timer all have a finite out-of-time delay in their operation. As a result of this, a delay occurs in the activation of the output circuitry for some time after the parity timer should have enabled the outputs. If in the mean time an output has gone low or an extra one has gone high, the output circuits will latch into a state which represents a transient condition and not the condition which existed during the majority of the time that the parity timer was timing.

Because the parity timer is a long duration timer, its delay will be fairly large. In most applications, this has been on the order of several tens of microseconds for a timer with a timing period of around 25 milliseconds. In order to solve the resulting problem, one approach that has been attempted is to try to shorten the delay of the parity checking circuit and parity timer. This delay however can never be reduced to zero and will always leave some finite probability of the problem occurring. A more reasonable approach is to try to introduce a delay signal equal to the parity checking circuit delay plus the parity timer delay into the path between each detector and output circuit. The disadvantage of this approach is that delays could never be balanced exactly allowing a finite chance of error. Accordingly neither of these solutions is fully satisfactory and accordingly it is the object of the present invention to provide a new and approach to synchronization that overcomes such problems.

SUMMARY OF THE INVENTION

In the present invention the problem of time delay is overcome by synchronizing the output of the detectors with a clock signal, so that changes in the detector stage from "on" to "off" or "off" to "on" can only occur at the beginning of a clock cycle. If the chosen clock period is short compared to the fastest expected changes of the unsynchronized detector outputs, very little information is lost due to the quantization of timing. The synchronization of detector outputs is accomplished by a first or input latch stage consisting of ordinary master-slave "D" type flip-flops with the "D" input tied to the unsynchronized detector output and the clock input tied to a clock source. The "Q" or "true" output of the flip-flop then becomes the synchronized output.

In the arrangement of the present invention, the parity checking circuit is fed from the sychronized detector outputs and incorporates a short (compared to the clock period) delay at the output to make sure that the flip-flops and the checking circuitry have settled before an output occurs from the parity checker. Alternatively a "D" flip-flop running from the opposite half of the clock could be used. A second or intermediate latch stage of "D" flip-flops utilizes the delayed output of the parity checker as a clock to sample the synchronized detector outputs. Thus any valid combination of inputs is locked into the second stage when it first is recognized and is left there until there is an interval of no parity, followed by another interval of parity. The parity timer, times the delayed output of the parity checking circuit by charging a capacitor when parity exists and discharging it when parity is no longer present. When the capacitor is changed to a high enough voltage, an output occurs to the parity timer. Such an arrangement is well known and does not necessarily from a portion of the present invention. When an output does occur it passes through another "D" flip-flop which is triggered from the clock. This guarantees that the second stage of flip-flops has settled before the output of the flip-flop connected to the parity timer and gated from the clock source, triggers a third or output latch stage.

It should also be noted that while the present invention has been drawn primarily to a synchronizer circuit for use with a multi-channel tone receiver it would also be possible to employ similar technique for single channel tone detection wherein synchronization is also required. In such an arrangement the obvious change required would be, to eliminate the parity checking circuit since no parity checking would be performed. The remaining circuitry would be similar to that suggested.

BRIEF DESCRIPTION OF THE DRAWING

The attached single sheet of drawings is a functional and logic diagram of a tone synchronizer circuit in accordance with the present invention.

DESCRIPTION OF THE PREFERRED EMBODIMENT

Referring to the drawing of the present invention a tone synchronizer for use with a multi-channel tone receiver in accordance with the present invention is shown. The circuitry includes a plurality of "D" type flip-flop circuits, which function as latching circuits. Each flip-flop has two inputs (D and C) which is response to true signals on both, to cause a true output to appear on the flip-flop output (Q) and remain in that state until the next clock pulse or input signal on the C input, at which time the output will remain true if a signal is still present on the "D" input or alternately the output will become false if no signal is present on the "D" input. This type of flip-flops is well known in the electronics art and is available as integrated circuits from a number of commercial suppliers.

In the present circuit, the "D" inputs of flip-flops numbered 1 through 6 inclusive are connected to the outputs of the tone detectors, and their respective "C" inputs connected to a source of clock pulses. The outputs (Q) of flip-flops 1–6 provide the initial synchronized detector outputs. These outputs are connected to the "D" inputs of a second group of flip-flops (8 through 13 inclusive) and also to a parity checking circuit 7. The output of the parity checking circuit is connected to an R/C delay network consisting of resistor 22 and capacitor 23 and buffer gate 24. This circuit produces a fractional clock pulse delay of the rise or fall of the parity checking circuit output. The buffered output from the delay circuit connects to the "C" input of flip-flops 8 through 13 inclusive. The delay circuit consisting of resistor 22, capacitor 23 and buffer 24 could be replaced by another "D" type flip-flop with its "D" input connected to the output of the parity checking circuit 7 and its clock input connected to the compliment of the provided clock signal. The timer circuit 14 receives its input from the output of buffer 24 and feeds its output to the input of another "D" flip-flop 15.

The parity timer disclosed is a well known type of capacitor charge-discharge timer in which a capacitor is charged when the input of the timer is high and discharged when the input is low. In the arrangement there are two limit values $V_H$ and $V_L$ and the capacitor cannot charge above $V_H$ or below $V_L$. When the capacitor charges to $V_H$, the timer output will go high and remain high until the input of the timer goes low for a long enough period for the capacitor to discharge to $V_L$, at which time the output will go low. The output of this timer will then stay low until the input has been high long enough to charge the capacitor again above $V_H$, causing the output to go high. The described timer circuitry is well known in the art and commercially available. Flip-flop 15 allows the output stage consisting of flip-flops 16 through 21 inclusive, to be triggered by timer 14 only in synchronism with pulses from the clock source.

The tone synchronizer of the present invention as disclosed functions as follows: normally two of the connected detectors are turned on, and at the next occurring clock pulse two flip-flops (for example, flip-flops 1 and 2) in the first group (1–6) would go high at their output (Q). The parity checking circuit 7 would then function in any well known manner to detect parity and output a signal which after a fractional portion of a clock pulse, will emerge from buffer 24, triggering flip-flop 8 and 9 into their true state. In this manner the varified combination will be locked into the second stage (flip-flops 8 through 13 inclusive) turning on flip-flops 8 and 9. This signal provides an output from flip-flops 8 and 9 to the "D" inputs of flip-flops 16 and 17 included in the last or output state (flip-flop 16 through 21). After the delay additionally inserted by timer 14 which is applied to the "D" input of flip-flop 15 and on the occasion of the next clock pulse applied to the "C" input of flip-flop 15, flip-flop 16 and 17 will be gated "on" to produce at their output (Q) true or high signals properly synchronized and indicative of the originally detected signals.

It will be obvious from the above that for single channel operation the circuit arrangement would be similar with the exception of elimination of the parity checking circuit 7 in which case assuming that a single channel employed flip-flops 1, 8 and 16 the output from flip-flop 1 as well as being connected to the input (D) of flip-flop 8 will also be connected to resistor 22 of the delay network that also includes capacitor 23 and buffer 24. With the exception of the elimination of parity checking the operation would be exactly as outlined above for the multi-channel device.

While but selected embodiments of the present invention have been shown and/or described, it would be obvious to those skilled in the art that numerous modifications may be made without departing from the spirit of the present invention which shall be limited only by the scope of the claims appended hereto.

What is claimed is:

1. A tone synchronizer circuit connected to at least one tone detector and to a source of regularly recurring clock pulses, said tone synchronizer circuit comprising: input latch means connected to said tone detector and including a circuit connection to said pulse source, conditioned in response to a signal from said tone detector and operated in response to a pulse from said pulse source; output latch means including an output circuit; intermediate latch means connected between said input latch means and said output latch means, conditioned in response to operation of said input latch means; a timer circuit; a delay circuit connected between said input latch means and said timer and including an output circuit connection to said intermediate latch means, operated in response to operation of said input latch means after a predetermined period of time, to operate said timer circuit and to operate said conditioned intermediate latch means; said output latch means conditioned in response to operation of said intermediate latch means; and a control latch circuit connected between said timer circuit and said output latch means and including a circuit connection to said pulse source, conditioned in response to operation of said timer circuit and operated in response to a pulse from said pulse source, to operate said conditioned output latch means; whereby a synchronized output signal representative of the signal from said connected tone detector is generated at said output latch means output circuit.

2. A tone synchronizer circuit as claimed in claim 1, wherein: said input latch means comprise a plurality of input latch circuits each connected to a different tone detector and each including a circuit connection to said pulse source; said output latch means comprise a plurality of output latch circuits each including an output circuit; said intermediate latch means comprise a plurality of intermediate latch circuits, each connected between a different input latch circuit and a different output latch circuit; said delay circuit further including circuit connections to each of said input latch circuits and an output circuit connection to each of said intermediate latch circuits; and said control latch circuit further including circuit connections to each of said output latch circuits.

3. A tone synchronizer circuit as claimed in claim 2, wherein: there is further included a checking circuit connected to each of said input latch circuits and including an output circuit connection to said delay circuit, operated in response to verification that valid signals are present from at least two of said operated input latch circuits, to operate said delay circuit.

4. A tone synchronizer circuit as claimed in claim 2, wherein: each of said latch circuits comprise a "D" type flip-flop.

5. A tone synchronizer circuit as claimed in claim 1, wherein: said delay means include a resistor/capacitor network.

6. A tone synchronizer circuit as claimed in claim 5, wherein: said delay means further include a buffer amplifier connected between said resistor/capacitor network and said timer.

* * * * *